(12) United States Patent
Lindsay et al.

(10) Patent No.: US 12,128,507 B2
(45) Date of Patent: Oct. 29, 2024

(54) SYSTEMS AND METHODS FOR MULTI-PATH GOUGING

(71) Applicant: Hypertherm, Inc., Hanover, NH (US)

(72) Inventors: Jon W. Lindsay, Grantham, NH (US); Justin Gullotta, Brownsville, VT (US); Martin Higgens, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 771 days.

(21) Appl. No.: 16/688,605

(22) Filed: Nov. 19, 2019

(65) Prior Publication Data
US 2020/0156170 A1   May 21, 2020

Related U.S. Application Data

(60) Provisional application No. 62/769,655, filed on Nov. 20, 2018.

(51) Int. Cl.
*B23K 9/013*  (2006.01)
*B23K 9/095*  (2006.01)
*B23K 31/10*  (2006.01)

(52) U.S. Cl.
CPC ............ *B23K 9/013* (2013.01); *B23K 9/0953* (2013.01); *B23K 31/10* (2013.01)

(58) Field of Classification Search
CPC ........ B23K 9/09; B23K 9/0953; B23K 9/013; B23K 9/10; B23K 10/006; B23K 31/10; H05H 1/36
(Continued)

(56) References Cited

U.S. PATENT DOCUMENTS

| 4,076,082 A | | 2/1978 | Baum et al. |
| 4,954,683 A | * | 9/1990 | Hatch ...................... H05H 1/34 219/121.48 |

(Continued)

FOREIGN PATENT DOCUMENTS

| EP | 0304855 A1 | 3/1989 |
| GB | 845410 A | 8/1960 |

(Continued)

OTHER PUBLICATIONS

Powermax 125 Opertaor Manual 808080 Revision 3.
(Continued)

*Primary Examiner* — Eric S Stapleton
(74) *Attorney, Agent, or Firm* — Cesari and McKenna, LLP (57) ABSTRACT

A method for determining operating parameters to process a workpiece using a manufacturing processing system including a plasma arc gouging torch. The method includes positioning a plasma arc gouging torch at a location relative to a workpiece and determining a start point and an end point for each gouging path based on the location and a gouge profile. The method further includes using the gouging profile to determine first operating parameters for the plasma arc gouging torch for a first gouging path and determining second operating parameters for the plasma arc gouging torch for a second gouging path based on the gouge profile and the first gouging path. The second operating parameters include at least one of a second torch speed or a torch offset. The method also includes using at least one of the first or second operating parameters to process the workpiece with the plasma arc gouging torch.

28 Claims, 9 Drawing Sheets

(58) Field of Classification Search
USPC .................................................. 219/121.56
See application file for complete search history.

(56) References Cited

U.S. PATENT DOCUMENTS

| | | | |
|---|---|---|---|
| 8,987,636 B2 | 3/2015 | Fagan | |
| 2003/0168786 A1* | 9/2003 | Pasulka | B23K 37/0258 266/58 |
| 2007/0114212 A1 | 5/2007 | Jones et al. | |
| 2012/0298632 A1* | 11/2012 | Riemann | B23K 10/006 219/121.44 |
| 2012/0298633 A1* | 11/2012 | Riemann | B23K 10/00 219/121.44 |
| 2014/0332504 A1* | 11/2014 | Hamada | B23K 31/00 901/3 |
| 2015/0129563 A1* | 5/2015 | Hodges | B23K 10/00 219/121.44 |
| 2016/0106993 A1 | 4/2016 | Watson et al. | |
| 2016/0221099 A1* | 8/2016 | Arndt | B23K 10/006 |
| 2018/0139833 A1* | 5/2018 | Patel | B23K 10/00 |

FOREIGN PATENT DOCUMENTS

| | | | | |
|---|---|---|---|---|
| JP | H11216571 A | | 8/1999 | |
| SU | 449788 A | * | 8/1975 | |
| SU | 823040 A1 | * | 4/1981 | ............. B23K 10/00 |
| WO | WO-9408747 A1 | * | 4/1994 | ............. B23K 10/00 |

OTHER PUBLICATIONS

Database WPI, Week 197638, Thomson Scientific, London, GB, AN 1976-71733X & SU 495 176 A (Shapiro I S); Mar. 17, 1976; 1 Page.
Database WPI, Week 197615, Thomson Scientific, London, GB, An 1976-27750X & SU 449 788 A (Shapiro I S); Aug. 4, 1975; 1 Page.
Database WPI, Week 198206, Thomson Scientific, London, GB, AN 1982-11435E & SU 825 298 B (Shapiro I S); Apr. 30, 1981; 1 Page.
Alban Jr., J. F. "Revival of a Lost Art: Plasma Arc Gouging of Aluminum," Weding Journal Suppl. Welding Research; vol. 55, No. 10, Nov. 1, 1976; 6 Pages.
Hamada, et al "Development of Automatic Weld Bead Finishing System Using Plasma Arc Gouging," Welding in the World, Springer, vol. 58, No. 4, Jul. 1, 2014; 10 Pages.
Gorka, J. "Welding Technologies for the Removal of Defects in Welded Joints and Iron-Castings," Welding International, Taylor & Francis, Abingdon, GB, vol. 16, No. 5, pp. 341-346, Jan. 1, 2002, 6 Pages.
Heflin, R. L. "Plasma Arc Gouging of Aluminum" Welding Journal, vol. 64, No. 5, pp. 16-19, May 1, 1985; 4 Pages.

* cited by examiner

SYSTEMS AND METHODS FOR MULTI-PATH GOUGING

CROSS REFERENCE TO RELATED APPLICATION

This application claims the benefit of and priority to U.S. Provisional Patent Application No. 62/769,655, filed Nov. 20, 2018, the entire contents of which are owned by the assignee of the instant application and incorporated herein by reference in their entirety.

FIELD OF THE INVENTION

The present invention relates generally to manufacturing processing systems, including systems and methods for determining operating parameters of plasma gouging systems.

BACKGROUND OF THE INVENTION

Many operators and technicians of manufacturing processing systems use gouging as a step in the process of accomplishing full penetration welds. For example, when welding two plates together at a joint, an operator normally welds one side of the joint using a series of weld passes before proceeding to the second side of the joint. However, the first weld passes nearest the center of the weld are exposed to atmosphere during welding, and as such need to be removed in order to eliminate weld deficiencies and improve the quality of the weld. After the exposed material has been removed, the operator can perform a series of weld passes on the second side in order to complete the welding of the joint between the two plates.

The current method of removing the exposed welding material is to apply gouging techniques to the second side of the joint such that the exposed welding material is removed along with portions of each plate. The gouging techniques (e.g., carbon arc or plasma arc) need to be performed in a consistent manner and with a desired shape across the joint in order to avoid voids when performing the welding on the second side of the joint. The particular geometry of the desired gouge depends on a number of factors including, among others, plate thickness, welder preferences, and design requirements. Often, the desired gouge geometry cannot be achieved with a single gouging pass; operators need to perform multiple gouging passes to approach the desired geometry. In practice, operators commonly use an inspection gage to insert in the gouge after each pass to see if enough material has been removed and the desired geometry achieved. As current gouging techniques are imprecise and remove varied large amounts of material which leave behind inconsistent surfaces, this trial and error approach is required. Once the gouge shape is close to the desired shape secondary machining (e.g., grinding) is required; this grinding commonly takes twice to three times as long to accomplish as the gouging process itself. This iterative process is imprecise, inefficient, and often takes hours to develop a proper gouge shape and profile for a single weld joint.

Therefore, there is a need to create a system which assists operators in defining a process recipe to achieve the desired gouging profile without requiring significant amounts of secondary machining and/or iteratively using an inspection gage after each gouging pass. This would allow operators to accomplish full penetration welds in an efficient manner using carbon arc gouging or plasma gouging solutions.

SUMMARY OF THE INVENTION

Accordingly, an object of the invention is to provide information related to a manufacturing processing operation to an operator of a gouging torch system. It is an object of the invention to determine operating parameters to process a workpiece using a manufacturing processing system. It is an object of the invention to determine operating parameters to process a workpiece using a plasma arc gouging torch. It is an object of the invention to determine operating parameters for gouging passes on a workpiece based on a desired gouge profile and initial operating parameters of an initial gouging pass and/or manufacturing processing system capabilities.

In some aspects, a method for determining operating parameters to process a workpiece using a manufacturing processing system including a plasma arc gouging torch includes positioning a plasma arc gouging torch at a location relative to a workpiece. The method further includes determining a start point and an end point for each of a plurality of gouging paths based on the location and a gouge profile. The method also includes using the gouge profile to determine first operating parameters for the plasma arc gouging torch for a first gouging path of the gouging paths. The method further includes determining second operating parameters for the plasma arc gouging torch for a second gouging path of the gouging paths based at least on the gouge profile and the first gouging path. The second operating parameters include at least one of a second torch speed or a torch offset relative to at least one of the gouging paths. The method also includes using at least one of the first or second operating parameters to process the workpiece with the plasma arc gouging torch.

In some embodiments, the first gouging path and the second gouging path are located on substantially a same plane and are oriented substantially parallel to one another. In some embodiments, the first operating parameters include at least one of a first torch speed, a first torch angle, a first torch height, a first torch amperage, or a first torch pressure, and the second operating parameters include at least one of the second torch speed, a second torch angle, a second torch height, a second torch amperage, the torch offset, or a second torch pressure. For example, in some embodiments, at least one of the second operating parameters are different than at least one of the first operating parameters. In other embodiments, the second torch speed of the second gouging path is greater than the first torch speed of the first gouging path. For example, the second torch speed of the second gouging path can be about 5% greater than the first torch speed of the first gouging path. In some embodiments, the second torch speed of the second gouging path is between 5% and 80% greater than the first torch speed of the first gouging path.

In other embodiments, the method further includes determining third operating parameters for a third gouging path of the gouging paths based at least on the gouge profile, the first gouging path, and the second gouging path. For example, a portion of the third gouging path can be located at a depth below a depth of an initial layer of the gouge profile. In some embodiments, a third torch speed of the third gouging path is less than a first torch speed of the first gouging path and a second torch speed of the second gouging path.

In some embodiments, the method further includes determining fourth operating parameters for a fourth gouging path of the gouging paths based at least on the gouge profile, the first gouging path, the second gouging path, and the third gouging path. For example, the fourth gouging path can be located at a depth of a last layer of the gouge profile. In some embodiments, a fourth torch speed of the fourth gouging path is greater than a third torch speed of the third gouging path.

In some aspects, a method for determining operating parameters to process a workpiece using a manufacturing processing system including a plasma arc gouging torch includes positioning a plasma arc gouging torch at a location relative to a workpiece. The method further includes calculating a start point and an end point for each of a plurality of gouging paths based on the location and a gouge profile. The method also includes using the gouge profile to determine first operating parameters for a first gouging path of the gouging paths. The method further including initiating the plasma arc gouging torch with at least one of the first operating parameters. The method also includes determining second operating parameters for a second gouging path of the gouging paths based at least on the gouge profile and the first gouging path. At least one of the second operating parameters are different than at least one of the first operating parameters. The method further includes initiating the plasma arc gouging torch with at least one of the second operating parameters.

In some embodiments, the first operating parameters and the second operating parameters include at least one of a torch offset relative to at least one of the gouging paths, a torch speed, a torch angle, a torch height, a torch amperage, or a torch pressure. For example, in some embodiments, the torch offset is more than 50% of a width of the first gouging path. In other embodiments, a second torch speed of the second gouging path is greater than a first torch speed of the first gouging path. For example, the second torch speed of the second gouging path can be about 5% greater than the first torch speed of the first gouging path. In some embodiments, the second torch speed of the second gouging path is between 5% and 80% greater than the first torch speed of the first gouging path.

In some embodiments, the method further includes determining third operating parameters for a third gouging path of the gouging paths based at least on the gouge profile, the first gouging path, and the second gouging path. For example, the third gouging path can be located at a depth below a depth of an initial layer of the gouge profile. In some embodiments, a third torch speed of the third gouging path is less than a first torch speed of the first gouging path and a second torch speed of the second gouging path. In other embodiments, the method further includes determining fourth operating parameters for a fourth gouging path of the gouging paths based at least on the gouge profile, the first gouging path, the second gouging path, and the third gouging path. For example, the fourth gouging path can be located at a depth of a last layer of the gouge profile. In some embodiments, a fourth torch speed of the fourth gouging path is greater than a third torch speed of the third gouging path.

In some aspects, a method for determining operating parameters to process a workpiece using a manufacturing processing system including a plasma arc gouging torch includes positioning a plasma arc gouging torch at a location relative to a workpiece. The method further includes determining a start point and an end point for a gouging path based on the location and a gouge profile. The method also includes using the gouge profile to determine operating parameters for the gouging path. The operating parameters include varying a lateral torch speed of the plasma arc gouging torch while performing a pass over the gouging path. The method further includes using at least one of the operating parameters to process the workpiece with the plasma arc gouging torch. The method also includes varying the lateral torch speed of the plasma arc gouging torch based on a location of the torch relative to an edge of the gouge profile. The lateral torch speed is a function of a depth of the gouge path at the location.

In some embodiments, the operating parameters include at least one of a torch angle, a torch height, a torch amperage, or a torch pressure. In other embodiments, an axial torch speed of the plasma arc gouging torch is constant. For example, in some embodiments, a ratio of the lateral torch speed and the axial torch speed varies based on the location of the torch relative to the edge of the gouge profile. In some embodiments, the ratio of the lateral torch speed and the axial torch speed is a maximum ratio and a distance between the location of the torch and the edge of the gouge profile is a minimum distance. In some embodiments, the maximum ratio is about 4. In other embodiments, the lateral torch speed is based on a material removal rate.

In some aspects, a method for determining operating parameters for a manufacturing processing system including a plasma arc gouging torch includes calculating a start point and an end point for each of a plurality of gouging paths based on the location and a gouge profile. The method further includes determining operating parameters for each of the gouging paths based at least on the gouge profile. The operating parameters include at least one of a torch speed or an offset relative to at least one of the gouging paths. In some embodiments, the method also includes initiating the plasma arc gouging torch with at least one the operating parameters for a second gouging path of the gouging paths.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for providing information related to a manufacturing processing operation to an operator of a gouging torch system. The system and methods can include one or more mechanisms or methods for determining operating parameters to process a workpiece using a manufacturing processing system. The system and methods can include one or more mechanisms or methods for determining operating parameters to process a workpiece using a plasma arc gouging torch. The system and methods can include one or more mechanisms or methods for determining operating parameters for gouging passes on a workpiece based on a desired gouge profile and initial operating parameters of an initial gouging pass and/or capabilities of the material processing system. Example capabilities of the material processing system include max torch speeds and acceleration rates.

In plasma gouging, the shape of the resultant gouge from a given single gouging pass is influenced by many factors including torch speed, torch angularity, gas pressure settings, plasma system settings, consumable condition, etc. For example, varying torch speed can influence the depth and width of the trough (and thereby the shape/angularity of the trough walls) created from a given gouging pass. A slower gouging pass exposes a given location of the workpiece to the plasma arc for a longer time, creating a deeper trough, while a faster gouging pass exposes the given location of the workpiece to the plasma arc for a briefer period, resulting in a shallower trough. The systems and methods described herein provide automated solutions that leverage the flexibility and versatility of plasma systems during gouging processes to design and implement single-pass or multi-pass gouging of materials to efficiently obtain a desired and/or tailored large gouge shape and geometry.

In one aspect, a system receives inputs from an end user, such as the plasma system to be used, the pre-gouging geometry capabilities of the system as currently configured (e.g., gouging consumables installed, torch positioning, etc.), and the desired post-gouging geometry, in order to develop a gouging "recipe." The system uses process data for the plasma system, including single pass gouging cross-section data, to develop the recipe. The system can provide the end user or automated gouging system with the process information for each gouging pass, the gouging pass sequence, and the torch position for each gouging pass. The system can develop a recipe that creates a single-pass or multi-pass gouging shape that matches a gouging inspection gage for a given type of weld or desired gouge profile. The recipe positions multiple gouging passes at different speeds or varies the speed(s) of a single pass to create a shape that best matches the inspection gage. The recipe selects the speeds such that the gouging pass angles best match the desired gouging angle at each location.

In one embodiment, the system compensates for the interaction between gouging passes and implements best practices for laying out single or multiple gouging passes. For example, when overlap occurs between passes, there is influence between gouging passes further adjusting the resultant trough geometry. In one embodiment, the system varies or orders the gouge passes to accommodate for multi-pass influences (e.g., to minimize overlap, to anticipate and eliminate a peak forming between two gouge passes, etc.), anticipating and adjusting for this influence. The use and implementation of the systems and methods described herein eliminates the need for the trial and error techniques currently required and employed by end users. The systems and methods described herein automatically apply gouging process knowledge to create a variety of gouging shapes/troughs desired by end users.

Referring to FIGS. 1-4, a gouging torch system 100 includes a workpiece 104 and a torch 102 that is configured to gouge the workpiece 104. The torch 102 is powered by a current and a voltage delivered by a power supply 410. In some embodiments, the gouging torch system 100 also includes processor 430, memory 440, and communication circuitry 420. In some embodiments, communication circuitry 420 of the gouging torch system 100 is configured to transfer data between the components of the gouging torch system 100 and between the gouging torch system 100 and other systems. Communication circuitry 420 can use Bluetooth, wired connection, Wi-Fi, or any comparable data transfer connection.

Figure 1:
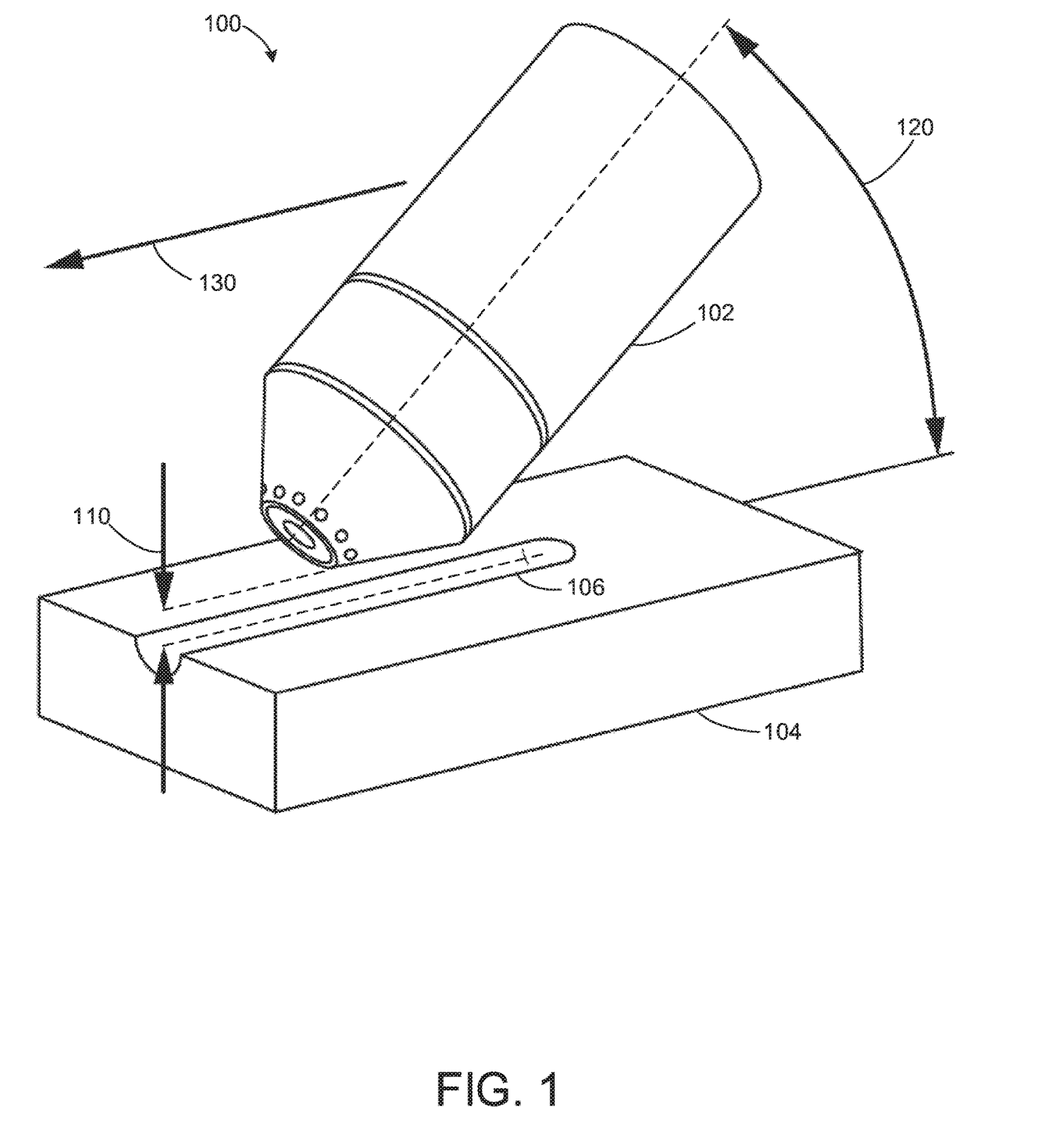
FIG. 1 is an isometric view of an exemplary gouging torch system, according to an embodiment of the invention.
Figure 2A:
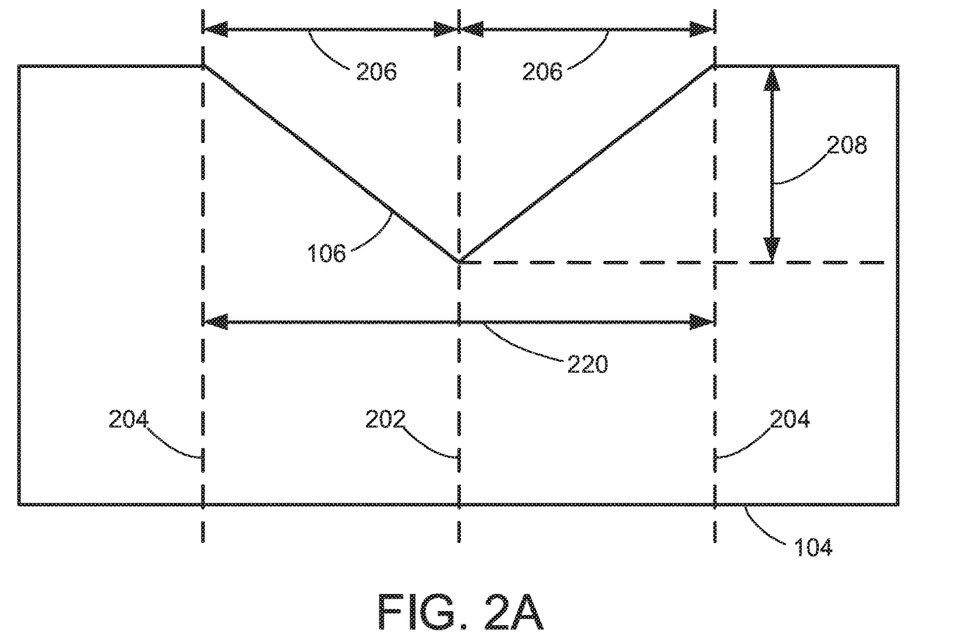
FIG. 2A is a cross-section of an exemplary gouge in a workpiece processed using the exemplary gouging system shown in FIG. 1, according to an embodiment of the invention.
Figure 2B:
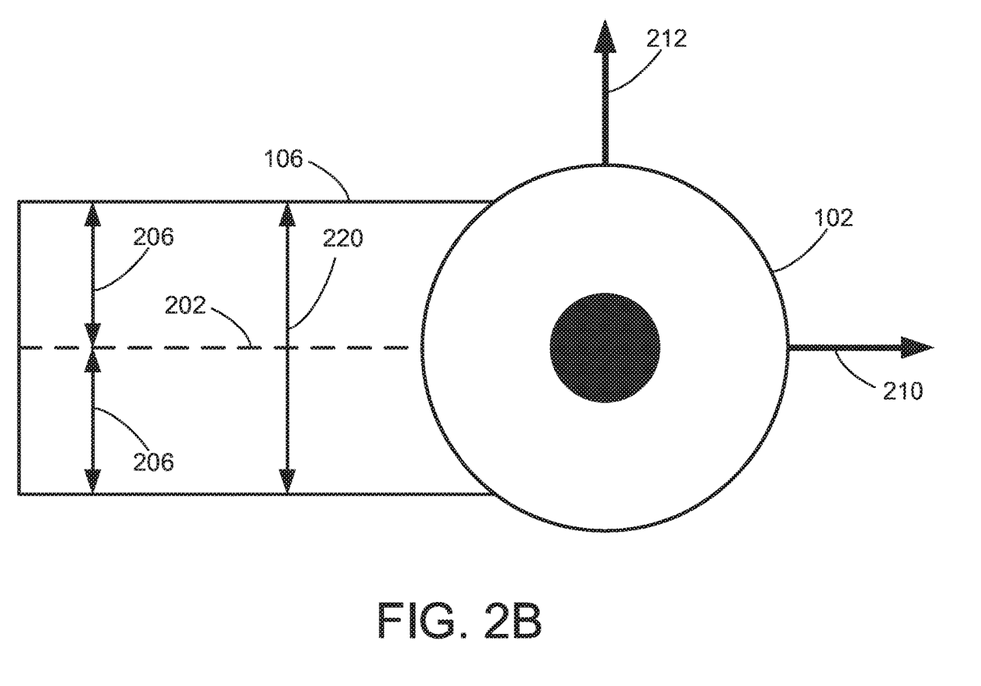
FIG. 2B is a top-down view of the exemplary gouge shown in FIG. 2A, according to an embodiment of the invention.

As shown in FIGS. 1, 2A, and 2B, the torch 102 is configured to create a gouge 106 in workpiece 104. The gouge 106 is divided by a center line 202, which corresponds to the path traversed by the center of torch 102 during the gouging process. The gouge 106 also includes gouge extremes 204, which correspond to the lateral extremes of the gouge 106 and are located at an arc distance 206 (e.g., one half a width of the single path gouge diameter/width 220) from the center line 202. The gouge 106 is defined by a gouge depth 208 and a gouge width 220. The shape, geometry, and properties of the created gouge 106 generally depend on a number of parameters. The main parameters include the standoff 110 between the torch 102 and the workpiece 104, the angle 120 between the torch 102 and the workpiece 104, the velocity 130 of the torch 102 with respect to the workpiece 104, and the current supplied to the torch 102 by the power supply 410. The velocity 130 of the torch includes an axial velocity 210 and a lateral velocity 212.

Assuming all other parameters remain constant, the effects of changing one of the parameters can be predicted. For example, increasing the axial velocity 210 of the torch 102 will decrease the width 220 and decrease the depth 208 of the gouge 106. Decreasing the axial velocity 210 of the torch 102 will increase the width 220 and increase the depth 208 of the gouge 106. On the other hand, changing the current supplied to the torch 102 by the power supply 410 has the opposite effect. For example, increasing the current supplied to the torch 102 by the power supply 410 will increase the width 220 and increase the depth 208 of the gouge 106. Decreasing the current supplied to the torch 102 by the power supply 410 will decrease the width 220 and decrease the depth 208 of the gouge 106.

With respect to changing the standoff 110 and angle 120 between the torch 102 and the workpiece 104, the effects on the width 220 of the gouge 106 is inversely proportional to the effects on the depth 208 of the gouge 106. For example, increasing the standoff 110 between the torch 102 and the workpiece 104 will increase the width 220 and decrease the depth 208 of the gouge 106. Decreasing the standoff 110 between the torch 102 and the workpiece 104 will decrease the width 220 and increase the depth 208 of the gouge 106. On the other hand, increasing the angle 120 between the torch 102 and the workpiece 104 will increase the width 220 and decrease the depth 208 of the gouge 106. Decreasing the angle 120 between the torch 102 and the workpiece 104 will decrease the width 220 and increase the depth 208 of the gouge.

Figure 3:
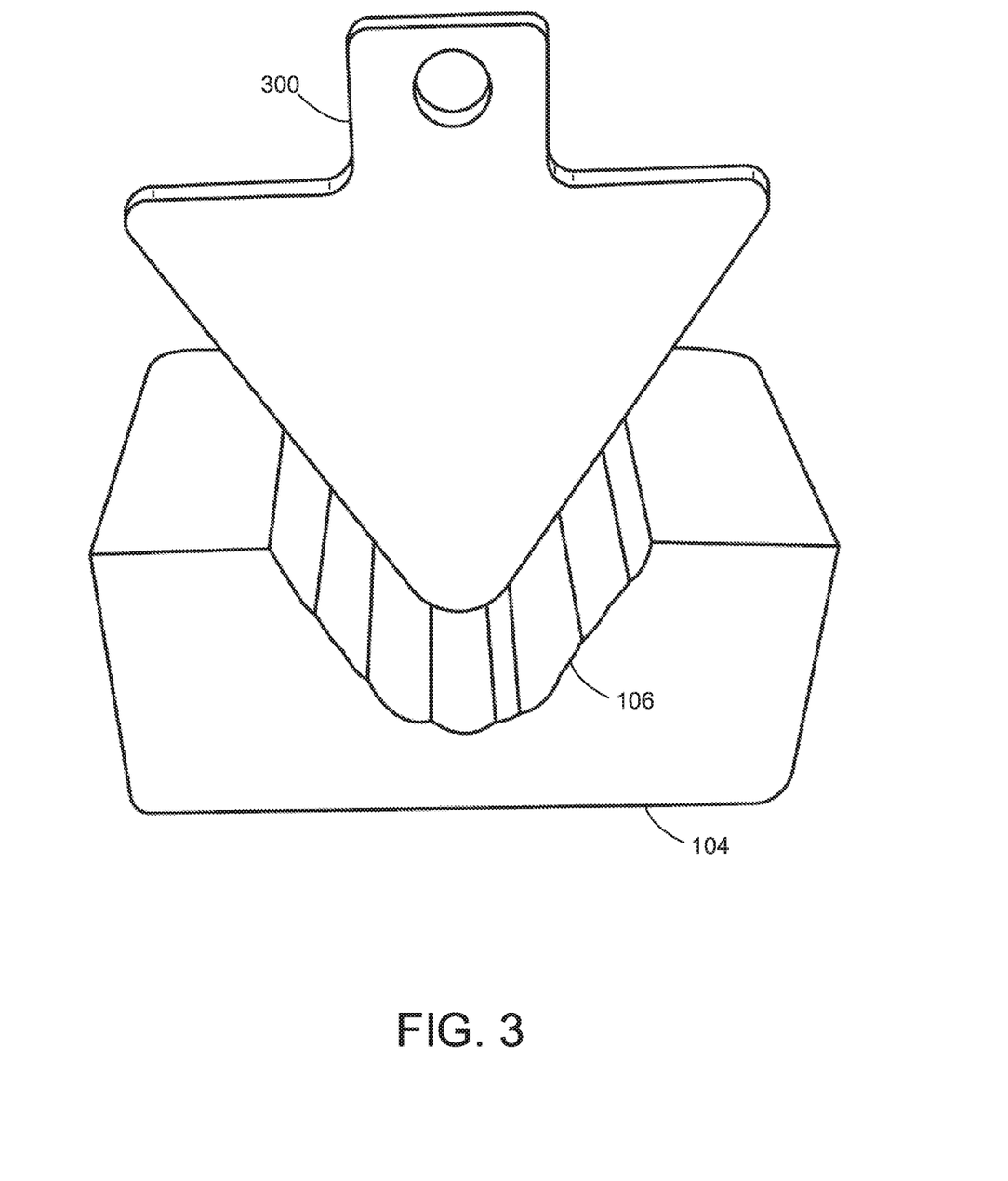
FIG. 3 is an illustrative representation of an exemplary inspection gage and multi-path gouge, according to an embodiment of the invention.
Figure 4:
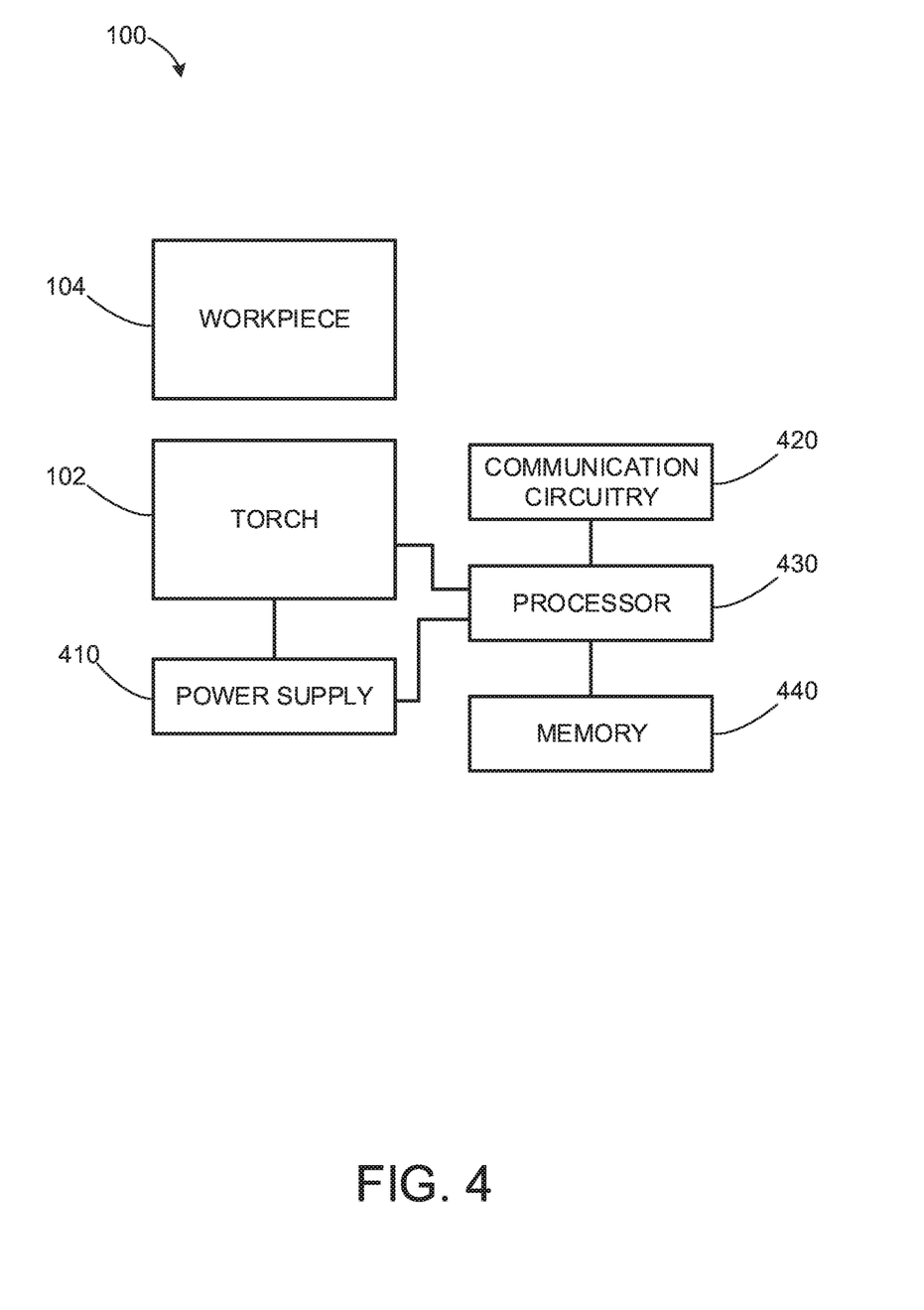
FIG. 4 is a block diagram of the exemplary gouging torch system shown in FIG. 1, according to an embodiment of the invention.

Despite the ability to control the depth 208 and width 220 of the gouge 106 using the above-described parameters, there exists a limit (e.g., maximum arc stretch) to the depth 208 and width 220 that can be achieved with a single pass of the torch 102. End users often use multiple passes to achieve a desired profile of the gouge 106. FIG. 3 shows an exemplary inspection gage 300 that is often used by end users to verify the profile of gouge 106 after multiple passes of the torch 102. When an end user uses the same parameters for every pass, the depth 208 achieved by the first pass is less than the depth 208 achieved by subsequent passes. This result is due to a change in the behavior of the workpiece/metal after the first pass as the dynamics of the process are changed for the second and any subsequent passes as the geometry of the workpiece and the metal about the gouge is changed with each pass. By modifying one or more operating parameters for the subsequent passes relative to the first pass, a substantially uniform gouge depth 208 and/or profile can be achieved.

Figure 5A:
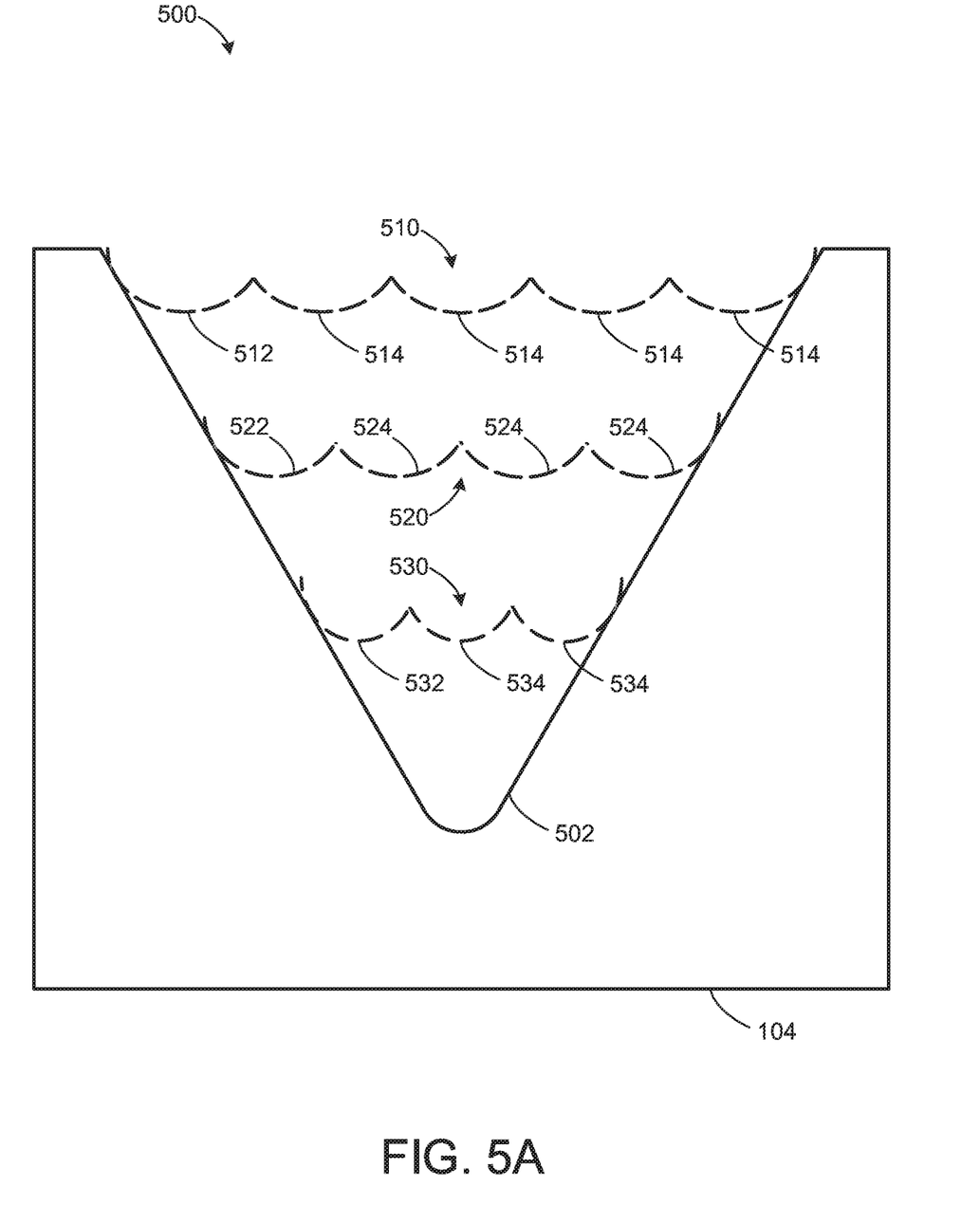
FIG. 5A is an illustrative cross-section of an exemplary symmetric multi-path gouge processed using the exemplary gouging system shown in FIG. 1, according to an embodiment of the invention.
Figure 5B:
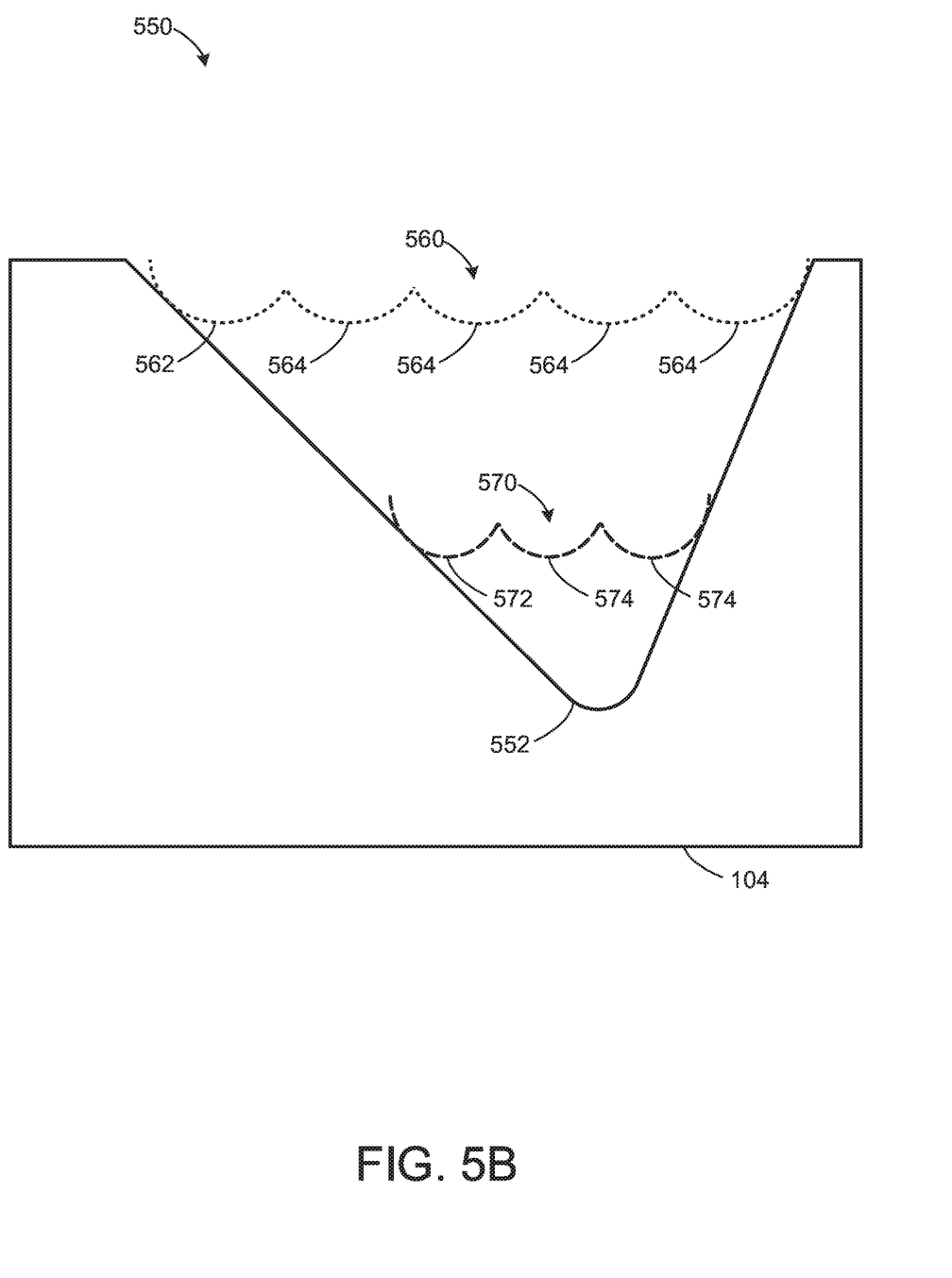
FIG. 5B is an illustrative cross-section of an exemplary non-symmetric multi-path gouge processed using the exemplary gouging system shown in FIG. 1, according to an embodiment of the invention.

Referring to FIGS. 5A and 5B, exemplary multi-path gouges in a workpiece 104 are illustrated. FIG. 5A illustrates a symmetric multi-path gouge 500 while FIG. 5B illustrates a non-symmetric multi-path gouge 550. As shown in FIG. 5A, the symmetric multi-path gouge 500 illustrates example paths a gouging torch 102 needs to perform across multiple layers in order to achieve a desired symmetric gouge profile 502. For example, three gouging layers 510, 520, and 530 are illustrated. The first gouging layer 510 includes a first gouging path 512 and subsequent gouging paths 514. The second gouging layer 520 includes a first gouging path 522 and subsequent gouging paths 524. The third gouging layer 530 includes a first gouging path 532 and subsequent gouging paths 534. The total number of paths per layer decreases for every successive layer, reaching one path for the last gouging layer.

Similarly, as shown in FIG. 5B, the non-symmetric multi-path gouge 550 illustrates example paths a gouging torch 102 needs to perform across multiple layers in order to a achieve a desired non-symmetric gouge profile 552. For example, two gouging layers 560 and 570 are illustrated. The first gouging layer 560 includes a first gouging path 562 and subsequent gouging paths 564. The second gouging layer 570 includes a first gouging path 572 and subsequent gouging paths 574. The total number of paths per layer decreases for every successive layer, reaching one path for the last gouging layer.

Gouging torch system 100 can generate a process recipe that achieves the desired gouge profile 502 using multiple passes of the gouging torch 102. As mentioned above, at least one of the operating parameters of the subsequent gouging paths 514 is different compared to the operating parameters of the first gouging path 512 in order to achieve the same gouge depth 208. For example, by increasing the axial velocity 210 of the subsequent gouging paths 514 with respect to the axial velocity 210 of the first gouging path 512, the same gouge depth 208 can be achieved. In addition to increasing the axial velocity 210, other parameters of the subsequent gouging paths 514 an be adjusted as well. For example, by decreasing the current supplied to the torch 102 by the power supply 410 for the subsequent gouging paths 514 with respect to the current supplied to the torch 102 for the first gouging path 512, the same gouge depth 208 can be achieved. Similarly, by increasing the standoff 110 for the subsequent gouging paths 514 with respect to the standoff for the first gouging path 512, the same gouge depth 208 can be achieved. The same gouge depth 208 can also be achieved by increasing or decreasing the angle 120 between the torch 102 and the workpiece 104 for the subsequent gouging paths 514 with respect to the angle 120 for the first gouging path 512. In some embodiments, two or more parameters are adjusted between the first gouging path 512 and the subsequent gouging paths 514.

In addition to changing the operating parameters between passes, the operating parameters can also be adjusted between gouging layers. For example, in order to maintain the angle of the sides of the gouge 106 at a constant, the axial velocity 210 of the paths of the second gouging layer 520 can be less than the axial velocity 210 of the paths of the first gouging layer 510. Similarly, the axial velocity 210 of the paths of the third gouging layer 530 can be less than the axial velocity 210 of the paths of the second gouging layer 520. In some embodiments, the axial velocity 210 of the path of the last gouging layer is greater than the axial velocity 210 of the paths of all the other gouging layers in order to achieve large side angles at the bottom of the desired gouge profile 502.

In some embodiments, the offset distance between gouges and/or gouge layers can be varied. Generally, the offset distance between gouging paths is more than half of the gouge width 220, but less than the full gouge width 220. However, the offset distance needs to be set such that the correct top width of the gouge 106 is achieved during a gouging path. In some embodiments, the offset distance is greater than about 50% of the gouge width 220. In some embodiments, the offset distance is less than about 100% of the gouge width 220. In some embodiments, the offset distance is about 75% of the gouge width 220. In some embodiments, the offset distance is about 80% of the gouge width 220.

One example recipe of an exemplary multi-path gouge 500 can be as follows: assuming a constant torch angle 120 of about 32.5 degrees, the axial velocity 210 and the standoff 110 of the first gouging path 512 of the first gouging layer 510 can be about 25 inches per minute (ipm) and about 0.669 inches (in), respectively, and the axial velocity 210 and the standoff 110 of the subsequent gouging paths 514 of the first gouging layer 510 can be about 33 ipm and about 0.733 in, respectively. The offset distance between the first gouging path 512 and the subsequent gouging paths 514 of the first gouging layer 510 can be about 0.3 in. For the second gouging layer 520, the axial velocity 210 and the standoff 110 of the first gouging path 522 can be about 25 ipm and about 0.507 in, respectively, while the axial velocity 210 and the standoff 110 of the subsequent gouging paths 524 can be about 33 ipm and about 0.571 in, respectively. The offset distance between the first gouging path 522 and the subsequent gouging paths 524 of the second gouging layer 520 can be about 0.292 in. The offset distance between the first gouging path 512 of the first gouging layer 510 and the first gouging path 522 of the second gouging layer 520 can be about 1.184 in. For the third gouging layer 530, the axial velocity 210 and the standoff 110 of the first gouging path 532 can be about 22.5 ipm and about 0.316 in, respectively, while the axial velocity 210 and the standoff 110 of the subsequent gouging paths 534 can be about 30 ipm and about 0.354 in, respectively. The offset distance between the first gouging path 532 and the subsequent gouging paths 534 of the third gouging layer 530 can be about 0.256 in. The offset distance between the first gouging path 512 of the first gouging layer 510 and the first gouging path 532 of the third gouging layer 530 can be about 0.088 in. The axial velocity 210 and the standoff 110 of the path of the last gouging layer can be about 75 ipm and about −0.15 in, respectively.

Figure 6:
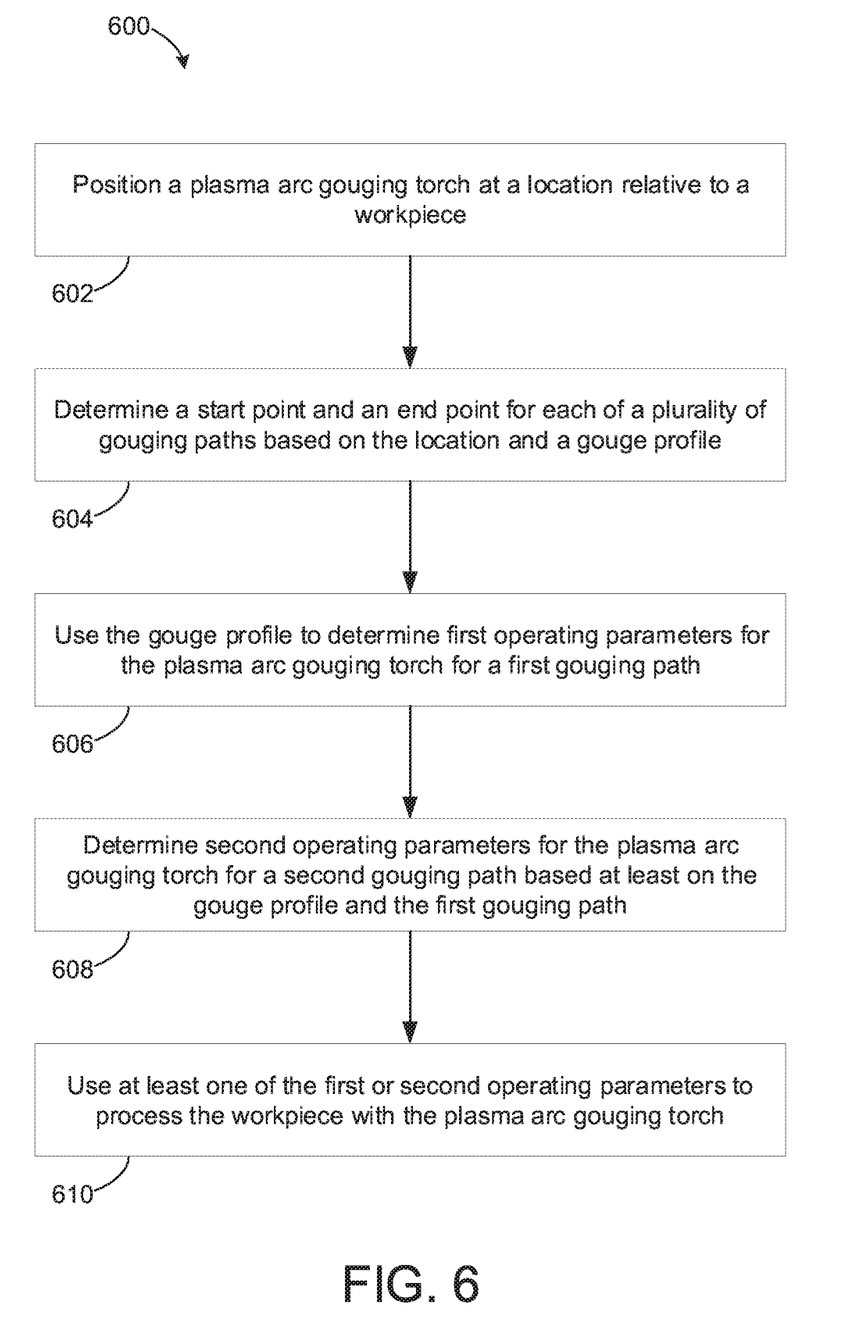
FIG. 6 is a flow diagram of method steps for determining operating parameters to process a workpiece using the exemplary gouging system shown in FIG. 1, according to an embodiment of the invention.

Referring to FIG. 6, a process 600 for determining operating parameters to process a workpiece 104 using a gouging torch system 100 comprising a plasma arc gouging torch 102 is illustrated. The process 600 begins by positioning a plasma arc gouging torch 102 at a location relative to a workpiece 104 in step 602. For example, the plasma arc gouging torch 102 can be positioned near the location of a desired gouge 106 on the workpiece 104. In some embodiments, process 600 begins by determining a start position for the plasma arc gouging torch 102 at a location relative to the workpiece 104. Process 600 continues by determining a start point and an end point for each of a plurality of gouging paths based on the location and a gouge profile 502 in step 604. For example, the gouging torch system 100 can determine a start point and an end point for a first gouging path 512 and a start point and an end point for each subsequent path 514. In some embodiments, processor 430 of the gouging torch system 100 calculates the start point and the end point for each of the gouging paths based on the location and the desired gouge profile 502.

Process 600 continues by using the gouge profile 502 to determine first operating parameters for the plasma arc gouging torch 102 for a first gouging path 512 in step 606. For example, the gouging torch system 100 can determine one or more of a first torch speed 210, a first torch angle 120, a first torch height 110, a first torch amperage, a first torch consumable selection, and a first torch pressure. Process 600 continues by determining second operating parameters for the plasma arc gouging torch 102 for a second gouging path 514 based at least on the gouge profile 502 and the first gouging path 512 in step 608. For example, the gouging torch system 100 can determine one or more of a second torch speed 210, a second torch angle 120, a second torch height 110, a second torch amperage, a second torch pressure, a second torch consumable selection, and/or a torch offset relative to the first gouging path 512. In some embodiments, the first gouging path 512 and the second gouging path 514 are located on substantially the same plane and are oriented substantially parallel to one another.

Process 600 finishes by using at least one of the first or second operating parameters to process the workpiece 104 with the plasma arc gouging torch 102 in step 610. For example, processor 430 can set the first or second operating parameters of the plasma arc gouging torch 102 before the gouging torch system 100 processes the workpiece 104 to produce a gouge 106. In some embodiments, at least one of the second operating parameters are different than at least one of the first operating parameters. In other embodiments, the second torch speed 210 of the second gouging path 514 is greater than the first torch speed 130 of the first gouging path 512. For example, the second torch speed 210 of the second gouging path 514 can be about 5% greater than the first torch speed 210 of the first gouging path 512. In some embodiments, the second torch speed 210 of the second gouging path 514 is between 5% and 80% greater than the first torch speed 210 of the first gouging path 512.

In some embodiments, process 600 continues by determining third operating parameters for a third gouging path located at a depth below a depth of an initial layer 510 of the gouge profile based at least on the gouge profile 502, the first gouging path 512, and the second gouging path 514. For example, gouging torch system 100 can determine third operating parameters for first gouging path 522 of second gouging layer 520 based on the gouge profile 502, the first gouging path 512, and/or the second gouging path 514. In some embodiments, a third torch speed 210 of the third gouging path is less than a first torch speed 210 of the first gouging path 512 and a second torch speed 210 of the second gouging path 514.

In some embodiments, process 600 continues by determining fourth operating parameters for a fourth gouging path located at a depth of a last layer of the gouge profile based at least on the gouge profile 502, the first gouging path 512, the second gouging path 514, and/or the third gouging path. For example, gouging torch system 100 can determine fourth operating parameters for the path of the last gouging layer based on the gouge profile 502, the first gouging path 512, the second gouging path 514, and/or first gouging path 522 of second gouging layer 520. In some embodiments, a fourth torch speed 210 of the fourth gouging path is greater than a third torch speed 210 of the third gouging path. For example, the torch speed 210 of the path of the last gouging layer can be greater than torch speed 210 of the first gouging path 522 of the second gouging layer 520.

Figure 7:
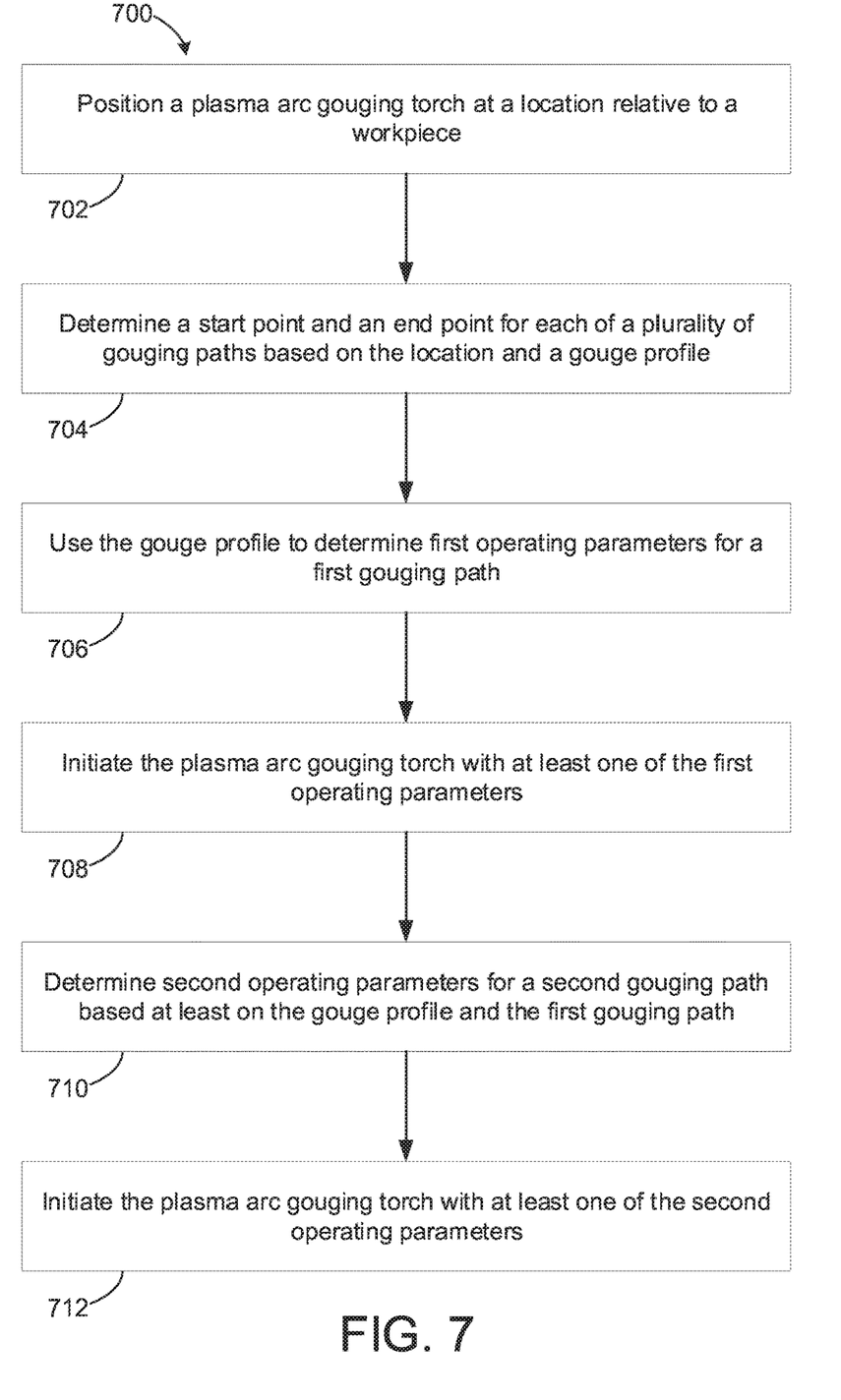
FIG. 7 is a flow diagram of method steps for determining operating parameters to process a workpiece using the exemplary gouging system shown in FIG. 1, according to an embodiment of the invention.

Referring to FIG. 7, a process 700 for determining operating parameters to process a workpiece 104 using a gouging torch system 100 comprising a plasma arc gouging torch 102 is illustrated. The process 700 begins by positioning a plasma arc gouging torch 102 at a location relative to a workpiece 104 in step 702. For example, the plasma arc gouging torch 102 can be positioned near the location of a desired gouge 106 on the workpiece 104. Process 700 continues by determining a start point and an end point for each of a plurality of gouging paths based on the location and a gouge profile 502 in step 704. For example, the gouging torch system 100 can determine a start point and an end point for a first gouging path 512 and a start point and an end point for each subsequent path 514. In some embodiments, processor 430 of the gouging torch system 100 calculates the start point and the end point for each of the gouging paths based on the location and the gouge profile 502.

Process 700 continues by using the gouge profile 502 to determine first operating parameters for a first gouging path 512 in step 706. For example, the gouging torch system 100 can determine one or more of a first torch speed 210, a first torch angle 120, a first torch height 110, a first torch amperage, a first torch consumable selection, and a first torch pressure. Process 700 continues by initiating the plasma arc gouging torch 102 with at least one of the first operating parameters in step 708. For example, processor 430 can set the first operating parameters as the operating parameters of the plasma arc gouging torch 102 before the gouging torch system 100 processes the workpiece 104 to produce a gouge 106. Process 700 continues by determining second operating parameters for a second gouging path 514 based at least on the gouge profile 502 and the first gouging path 512 in step 710. For example, the gouging torch system 100 can determine one or more of a second torch speed 210, a second torch angle 120, a second torch height 110, a second torch amperage, a second torch pressure, a torch consumable selection, and a torch offset relative to the first gouging path 512. In some embodiments, the torch offset is more than 50% of a width 220 of the first gouging path 512.

Process 700 finishes by initiating the plasma arc gouging torch 102 with at least one of the second operating parameters in step 712. For example, processor 430 can set the second operating parameters as the operating parameters of the plasma arc gouging torch 102 before the gouging torch system 100 processes the workpiece 104 to produce a gouge 106. In some embodiments, at least one of the second operating parameters are different than at least one of the first operating parameters. For example, in some embodiments, a second torch speed 210 of the second gouging path 514 is greater than a first torch speed 210 of the first gouging path 512. For example, the second torch speed 210 of the second gouging path 514 can be about 5% greater than the first torch speed 210 of the first gouging path 512. In some embodiments, the second torch speed 210 of the second gouging path 514 is between about 5% and about 80% greater than the first torch speed 210 of the first gouging path 514.

In some embodiments, process 700 continues by determining third operating parameters for a third gouging path located at a depth below a depth of an initial layer 510 of the gouge profile based at least on the gouge profile 502, the first gouging path 512, and the second gouging path 514. For example, gouging torch system 100 can determine third operating parameters for first gouging path 522 of second gouging layer 520 based on the gouge profile 502, the first gouging path 512, and the second gouging path 514. In some embodiments, a third torch speed 210 of the third gouging path is less than a first torch speed 210 of the first gouging path 512 and a second torch speed 210 of the second gouging path 514.

In some embodiments, process 700 continues by determining fourth operating parameters for a fourth gouging path located at a depth of a last layer of the gouge profile based at least on the gouge profile 502, the first gouging path 512, the second gouging path 514, and the third gouging path. For example, gouging torch system 100 can determine fourth operating parameters for the path of the last gouging layer based on the gouge profile 502, the first gouging path 512, the second gouging path 514, and first gouging path 522 of second gouging layer 520 (the third gouging path). In some embodiments, a fourth torch speed 210 of the fourth gouging path is greater than a third torch speed 210 of the third gouging path. For example, the torch speed 210 of the path of the last gouging layer can be greater than torch speed 210 of the first gouging path 522 of the second gouging layer 520.

In other embodiments, current adjustments between passes, torch angularity between passes, pressure adjustments between passes, offset adjustments between passes, consumable selection changes between passes, etc. can be used in place of or in conjunction with the above discussed speed adjustments/variations between passes to achieve the desired gouge profile.

In addition to the multi-path gouging processes described above in relation to FIGS. 6 and 7, gouging torch system 100 can perform a gouge 106 using a single pass of the gouging torch 102 by varying the lateral velocity 212 of the plasma arc gouging torch 102. This type of single pass is known as a weaving gouge because the gouging torch 102 adjusts its lateral velocity 212 while having a substantially constant axial velocity 210. This lateral motion in conjunction with axial motion creating a wider gouge in a single path via the lateral accelerations and decelerations of the torch across a width of the desired gouge profile 502. A desired gouge profile 502 can be achieved by varying the lateral velocity 212 from a minimum near the center line 202 to a maximum near the gouge extremes 204. The axial velocity 210 and lateral velocity 212 can be calculated from known and/or desired quantities. For example, the substantially constant axial velocity 210 of a weaving gouge can be calculated using:

$$\text{Axial Velocity} = \frac{\text{Metal Removal Rate}}{\text{Gouge XS Area} * \text{Metal Density}}$$

where,

Metal Removal Rate is nearly constant and can be measured or calculated from a single pass;

Metal Density is a known constant that is determined from the metal properties; and Gouge XS Area is the known cross-sectional area of the desired gouge profile 502.

The Metal Removal Rate can be measured as a function of speed from a single pass and is equal to the product of the speed of the single pass, the cross-sectional area of the single pass, and the Metal Density. The speed profile or lateral velocity 212 at a given point can be determined from the maximum gouge depth desired from the gouge profile 502 and a maximum lateral velocity achievable using the gouging torch system 100 (e.g., system capabilities). The maximum lateral velocity can be determined by system capabilities and can correspond to the lateral velocity 212 at the location of the gouge 106 with the minimum gouge depth 208. Often, the minimum gouge depth 208 is near the edge of the desired gouge profile 502. The maximum lateral velocity cannot be greater than the maximum lateral velocity achievable using the gouging torch system 100. A depth ratio at a specific location (x) of the gouge 106 can be calculated along the width of the gouge 106 using:

$$\text{Depth Ratio } (x) = \frac{\text{Desired Depth } (x)}{\text{Minimum Gouge Depth}}$$

where,

Desired Depth (x) is the desired depth at a distance x from the center line 202 based on the desired gouge profile 502; and Minimum Gouge Depth is the minimum gouge depth desired based on the desired gouge profile 502.

Once the depth ratio is calculated along the width of the gouge 106, a speed ratio can be determined along the width (e.g., between lateral extremes/extents/bounds) of the gouge 106 as well. The speed ratio is inversely proportional to the depth ratio, and can be determined from a speed-depth table. The speed-depth table can be generated by setting the maximum transverse velocity to correspond to the minimum gouge depth. Table 1 below is an example speed-depth table:

TABLE 1

| Speed (IPM) | Speed Ratio | Depth (in) | Depth Ratio |
|---|---|---|---|
| 20 | 0.4 | 0.38 | 1.9 |
| 25 | 0.5 | 0.31 | 1.55 |
| 30 | 0.6 | 0.28 | 1.4 |
| 35 | 0.7 | 0.25 | 1.25 |

TABLE 1-continued

| Speed (IPM) | Speed Ratio | Depth (in) | Depth Ratio |
|---|---|---|---|
| 40 | 0.8 | 0.22 | 1.1 |
| 45 | 0.9 | 0.21 | 1.05 |
| 50 | 1 | 0.2 | 1 |

Once the speed ratio along the width of the gouge 106 is determined, the lateral velocity at a specific location (x) of the gouge 106 can be calculated along the width of the gouge 106 using:

Lateral Velocity (x)=Maximum Lateral Velocity*Speed Ratio (x)

where,

Maximum Lateral Velocity is a constant and corresponds to the maximum lateral velocity achievable using the gouging torch system 100. Calculation of the lateral velocities at specific locations along the width of the gouge 106 yields a velocity and/or acceleration profile to achieve the desired gouge profile shape. As the system sets the torch path with an axial velocity 210 and a lateral velocity 212 in accordance with these profiles, in some embodiments the tip of the gouging torch 102 is set to not reach either of the lateral extremes of the width of the desired gouge profile 502 so as to not gouge the workpiece outside of the desired gouge path and to maintain the desired minimum gouge depth 208. In some embodiments the tip of the gouging torch 102 is limited in lateral direction movements to coming within an arc distance 206 of the lateral edges of the gouge 106.

Figure 8:
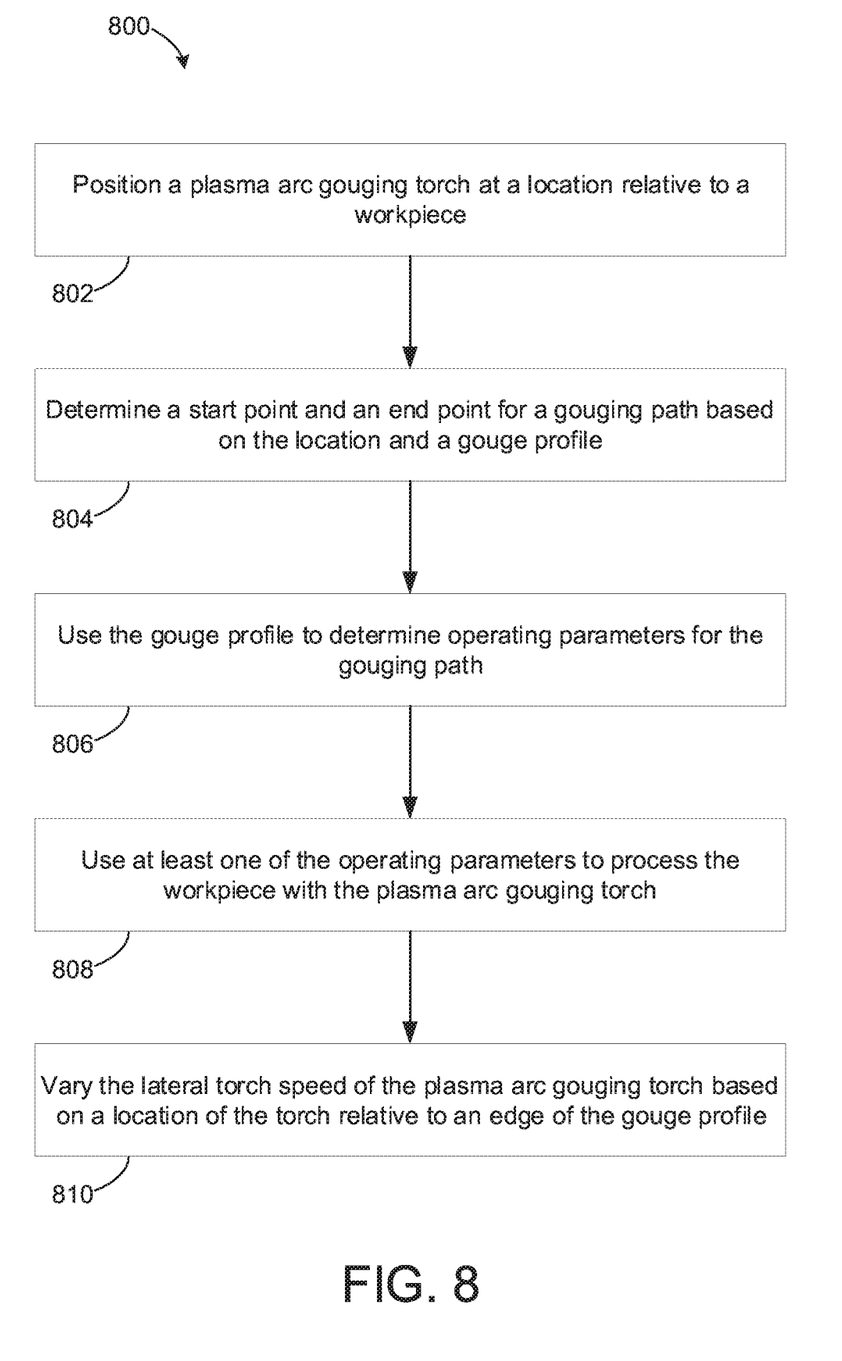
FIG. 8 is a flow diagram of method steps for determining operating parameters to process a workpiece using the exemplary gouging system shown in FIG. 1, according to an embodiment of the invention.

Referring to FIG. 8, a process 800 for determining operating parameters to process a workpiece 104 using a gouging torch system 100 comprising a plasma arc gouging torch 102 is illustrated. The process 800 begins by positioning a plasma arc gouging torch 102 at a location relative to a workpiece 104 in step 802. For example, the plasma arc gouging torch 102 can be positioned near the location of a desired gouge 106 on the workpiece 104. Process 800 continues by determining a start point and an end point for a gouging path based on the location and a gouge profile 502 in step 804. For example, the gouging torch system 100 can determine a start point and an end point for a first gouging path 512. In some embodiments, processor 430 of the gouging torch system 100 calculates the start point and the end point for a plurality of gouging paths based on the location and the gouge profile 502.

Process 800 continues by using the gouge profile 502 to determine a plurality of operating parameters for the gouging path 512 in step 806. In some embodiments, the plurality of operating parameters comprises varying a lateral torch speed 212 of the plasma arc gouging torch 102 while performing a pass over the gouging path 512. For example, gouging torch system 100 can determine at least one of a lateral torch speed 212, a torch angle 120, a torch height 110, a torch amperage, and a torch pressure. Process 800 continues by using at least one of the operating parameters to process the workpiece 104 with the plasma arc gouging torch 102 in step 808. For example, processor 430 can set the operating parameters of the plasma arc gouging torch 102 before the gouging torch system 100 processes the workpiece 104 to produce a gouge 106.

Process 800 finishes by varying the lateral torch speed 212 of the plasma arc gouging torch 102 based on a location of the torch 102 relative to an edge of the gouge profile 502 in step 810. In some embodiments, the lateral torch speed 212 is a function of a depth 208 of the gouge path 512 at the location. In some embodiments, the lateral torch speed 212 is proportional to a depth 208 of the gouge path 512 at the location. In some embodiments, an axial torch speed 210 of the plasma arc gouging torch 102 is constant. In other embodiments, a ratio of the lateral torch speed 212 and the axial torch speed 210 varies based on the location of the torch relative to the edge of the gouge profile 502. For example, the ratio of the lateral torch speed 212 and the axial torch speed 210 can be a maximum ratio when a distance between the location of the torch 102 and the edge of the gouge profile 502 is a minimum distance. In some embodiments, the maximum ratio is about 4. In some embodiments, the lateral torch speed 212 is based on a material removal rate. In some embodiments, the axial speed of the torch 210 is varied along with the lateral speed of the torch 212 so as to influence/achieve the desired gouge profile shape. These variations of the axial speed of the torch 210 based in part on a position of the torch 102 relative to the gouge 106 and/or workpiece 104.

The systems and methods described herein provide a number of benefits over the current state of the art, the advantages including: enables the application of plasma gouging for full penetration weld processing; provides an automated solution which removes the trial and error processes currently required by end users to achieve specific gouge profiles; reduces secondary work normally required on large gouges; creates a standardized process for producing specific/finely shaped gouges without the need for a highly sophisticated operator.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one programmable processor or on multiple programmable processors.

Processor 430 can perform the above-described method steps by executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processor 430 may include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data.

Memory device 440 can be used to temporarily store data, such as a cache. Memory device 440 can also be used for long-term data storage. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

The components of the gouging torch system 100 can be interconnected by communication circuitry 420 using transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Communication circuitry 420 can use one or more communication protocols to transfer information over transmission medium. Communication protocols can include, for example, Ethernet protocol, Internet Protocol (IP), Voice over IP (VOiP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

One skilled in the art will realize the invention can be embodied in other specific forms without departing from the spirit or essential characteristics thereof. The foregoing embodiments are therefore to be considered in all respects illustrative rather than limiting of the invention described herein. It will be appreciated that the illustrated embodiments and those otherwise discussed herein are merely examples of the invention and that other embodiments, incorporating changes thereto, including combinations of the illustrated embodiments, fall within the scope of the invention.

What is claimed:

1. A method for determining a plurality of operating parameters to process a workpiece to create a multi-pass gouging shape within the workpiece using a manufacturing processing system comprising a plasma arc gouging torch, the method comprising:
   positioning a plasma arc gouging torch at a location relative to a workpiece;
   determining a start point and an end point for each of a plurality of gouging paths and gouging layers based on the location and a gouge profile;
   a. using the gouge profile to determine first operating parameters for the plasma arc gouging torch for a first gouging path of the plurality of gouging paths of a first gouging layer, the first operating parameters including a first torch angle between the torch and the workpiece, the torch angled in a direction of torch travel;
   b. determining second operating parameters for the plasma arc gouging torch for a second gouging path of the plurality of gouging paths of the first gouging layer based at least on the gouge profile and the first gouging path, wherein the second operating parameters comprise a second torch angle between the torch and the workpiece and a lateral torch offset distance relative to the first gouging path;
   c. using the first and second operating parameters to process the first gouging layer of the workpiece with the plasma arc gouging torch, and
   d. repeating step (a) for a second gouging layer, thereby obtaining a desired multi-pass gouging shape.

2. The method of claim 1, wherein the first gouging path and the second gouging path are located on substantially a same plane and are oriented substantially parallel to one another.

3. The method of claim 1, wherein the first operating parameters comprise at least one of a first torch speed, a first torch angle, a first torch height, a first torch amperage, or a first torch pressure, and the second operating parameters comprise at least one of the second torch speed, a second torch angle, a second torch height, a second torch amperage, the torch offset, or a second torch pressure.

4. The method of claim 3, wherein at least one of the second operating parameters are different than at least one of the first operating parameters.

5. The method of claim 3, wherein the second torch speed of the second gouging path is greater than the first torch speed of the first gouging path.

6. The method of claim 5, wherein the second torch speed of the second gouging path is about 5% greater than the first torch speed of the first gouging path.

7. The method of claim 5, wherein the second torch speed of the second gouging path is between about 5% and 80% greater than the first torch speed of the first gouging path.

8. The method of claim 1, further comprising:
   determining third operating parameters for a third gouging path of the plurality of gouging paths based at least on the gouge profile, the first gouging path, and the second gouging path,
   wherein a portion of the third gouging path is located at a depth below a depth of an initial layer of the gouge profile.

9. The method of claim 8, wherein a third torch speed of the third gouging path is less than a first torch speed of the first gouging path and a second torch speed of the second gouging path.

10. The method of claim 8, further comprising:
    determining fourth operating parameters for a fourth gouging path of the plurality of gouging paths based at least on the gouge profile, the first gouging path, the second gouging path, and the third gouging path,
    wherein the fourth gouging path is located at a depth of a last layer of the gouge profile.

11. The method of claim 10, wherein a fourth torch speed of the fourth gouging path is greater than a third torch speed of the third gouging path.

12. A method for determining a plurality of operating parameters to process a workpiece to create a multi-pass gouging shape within the workpiece using a manufacturing processing system comprising a plasma arc gouging torch, the method comprising:
- positioning a plasma arc gouging torch at a location relative to a workpiece;
- calculating a start point and an end point for each of a plurality of gouging paths and gouging layers based on the location and a gouge profile;
- a. using the gouge profile to determine first operating parameters for a first gouging path of the plurality of gouging paths of a first gouging layer, the first operating parameters including a first torch angle between the torch and the workpiece, the torch angled in a direction of torch travel;
- b. initiating the plasma arc gouging torch with at least one of the first operating parameters;
- c. determining second operating parameters for a second gouging path of the plurality of gouging paths for the first gouging layer based at least on the gouge profile and the first gouging path, wherein at least one of the second operating parameters are different than at least one of the first operating parameters and include a second torch angle between the torch and the workpiece and a lateral torch offset distance relative to the first gouging path;
- d. initiating the plasma arc gouging torch with at least one of the second operating parameters, and
- e. repeating steps (a) and (b) for a second gouging layer, thereby obtaining a desired multi-pass gouging shape.

13. The method of claim 12, wherein the first operating parameters and the second operating parameters further comprise at least one of a torch speed, a torch angle, a torch height, a torch amperage, or a torch pressure.

14. The method of claim 13, wherein the torch offset is more than 50% of a width of the first gouging path.

15. The method of claim 13, wherein a second torch speed of the second gouging path is greater than a first torch speed of the first gouging path.

16. The method of claim 15, wherein the second torch speed of the second gouging path is about 5% greater than the first torch speed of the first gouging path.

17. The method of claim 15, wherein the second torch speed of the second gouging path is between about 5% and 80% greater than the first torch speed of the first gouging path.

18. The method of claim 12, further comprising:
- determining third operating parameters for a third gouging path of the plurality of gouging paths based at least on the gouge profile, the first gouging path, and the second gouging path,
- wherein the third gouging path is located at a depth below a depth of an initial layer of the gouge profile.

19. The method of claim 18, wherein a third torch speed of the third gouging path is less than a first torch speed of the first gouging path and a second torch speed of the second gouging path.

20. The method of claim 18, further comprising:
- determining fourth operating parameters for a fourth gouging path of the plurality of gouging paths based at least on the gouge profile, the first gouging path, the second gouging path, and the third gouging path,
- wherein the fourth gouging path is located at a depth of a last layer of the gouge profile.

21. The method of claim 20, wherein a fourth torch speed of the fourth gouging path is greater than a third torch speed of the third gouging path.

22. A method for determining a plurality of operating parameters to create a multi-pass gouging shape within a perimeter of a workpiece using a manufacturing processing system comprising a plasma arc gouging torch, the method comprising:
- positioning a plasma arc gouging torch at a location relative to a workpiece;
- determining a start point and an end point for a gouging path based on the location and a gouge profile;
- using the gouge profile to determine a plurality of operating parameters for the gouging path, wherein the plurality of operating parameters comprises varying a lateral torch speed of the plasma arc gouging torch while performing a pass over the gouging path;
- using at least one of the plurality of operating parameters to process the workpiece with the plasma arc gouging torch; and
- varying the lateral torch speed of the plasma arc gouging torch based on a location of the torch relative to an edge of the gouge profile such that the lateral torch speed is reduced near a center of the gouge and increased near edges of the gouge, wherein the lateral torch speed is also a function of a depth of the gouge path at the location.

23. The method of claim 22, wherein the plurality of operating parameters further comprises at least one of a torch angle, a torch height, a torch amperage, or a torch pressure.

24. The method of claim 22, wherein an axial torch speed of the plasma arc gouging torch is constant.

25. The method of claim 24, wherein a ratio of the lateral torch speed and the axial torch speed varies based on the location of the torch relative to the edge of the gouge profile.

26. The method of claim 25, wherein the ratio of the lateral torch speed and the axial torch speed is a maximum ratio and a distance between the location of the torch and the edge of the gouge profile is a minimum distance.

27. The method of claim 26, wherein the maximum ratio is about 4.

28. The method of claim 22, wherein the lateral torch speed is based on a material removal rate.

* * * * *